US009896256B2

(12) United States Patent
Pansegrouw

(10) Patent No.: US 9,896,256 B2
(45) Date of Patent: Feb. 20, 2018

(54) DUNNAGE BAG ARRANGEMENT

(71) Applicant: Stopak India Pvt. Ltd., Bangalore (IN)

(72) Inventor: Bester Jacobus Pansegrouw, Ottery (ZA)

(73) Assignee: Stopak India Pvt. Ltd., Bangalore (IN)

( * ) Notice: Subject to any disclaimer, the term of this patent is extended or adjusted under 35 U.S.C. 154(b) by 0 days.

(21) Appl. No.: 14/898,822

(22) PCT Filed: Jun. 13, 2014

(86) PCT No.: PCT/IB2014/062197
§ 371 (c)(1),
(2) Date: Dec. 16, 2015

(87) PCT Pub. No.: WO2014/203134
PCT Pub. Date: Dec. 24, 2014

(65) Prior Publication Data
US 2016/0130062 A1    May 12, 2016

(30) Foreign Application Priority Data

Jun. 21, 2013  (ZA) ................................ 2013/04659

(51) Int. Cl.
*B60P 7/08* (2006.01)
*B65D 81/05* (2006.01)
*B60P 7/06* (2006.01)

(52) U.S. Cl.
CPC ............ *B65D 81/052* (2013.01); *B60P 7/065* (2013.01)

(58) Field of Classification Search
CPC ................................ B60P 7/065; B65D 81/052

USPC .... 410/117–119, 125, 128, 154, 155; 383/3, 383/25, 109, 113; 206/522, 593; 428/35.2
See application file for complete search history.

(56) References Cited

U.S. PATENT DOCUMENTS

| 2,990,070 A | 6/1961 | Cushman |
| 3,028,981 A | 4/1962 | Ford et al. |
| 3,072,270 A | 1/1963 | Tolby et al. |
| 3,131,648 A | 5/1964 | Seger |
| 3,145,853 A | 8/1964 | Langenberg |
| 3,199,689 A | 8/1965 | Feldkamp |

(Continued)

FOREIGN PATENT DOCUMENTS

| CA | 2 254 253 | 6/2004 |
| EP | 0 924 140 | 6/1999 |

(Continued)

OTHER PUBLICATIONS

International Search Report for PCT/IB2014/062197 dated Sep. 3, 2014.

*Primary Examiner* — Stephen Gordon
(74) *Attorney, Agent, or Firm* — Neal, Gerber & Eisenberg LLP

(57) ABSTRACT

The invention discloses a dunnage bag arrangement for securing loads, includes an inflatable dunnage bag having a gastight inflatable bladder; and a hanger member connected to the dunnage bag and adapted to being supported on top of loads and adapted to support the dunnage bag in a void between loads. The dunnage bag includes a reinforcing sleeve made of at least one material ply, the sleeve having a first opening and a second opening, and the sleeve being folded and sealed and/or stitched to close off at least one of the openings.

23 Claims, 2 Drawing Sheets

(56) References Cited

U.S. PATENT DOCUMENTS

| | | |
|---|---|---|
| 3,442,402 A | 5/1969 | Baxter |
| 3,554,135 A | 1/1971 | Duvall et al. |
| 3,643,268 A | 2/1972 | Stamberger |
| 3,667,625 A | 6/1972 | Lucas |
| 3,868,026 A | 2/1975 | Baxter |
| 3,939,995 A | 2/1976 | Baxter |
| 4,102,364 A | 7/1978 | Leslie et al. |
| 4,116,344 A | 9/1978 | Ziemba |
| 4,136,788 A | 1/1979 | Robbins |
| 5,139,842 A | 8/1992 | Sewell |
| 5,868,534 A | 2/1999 | Goshorn et al. |
| 5,908,275 A | 6/1999 | Howlett et al. |
| 6,095,732 A | 8/2000 | Howlett, Jr. et al. |
| 6,149,362 A | 11/2000 | Berrier et al. |
| 6,186,714 B1 | 2/2001 | Berrier et al. |
| 6,220,800 B1 | 4/2001 | Elze et al. |
| 6,527,488 B2 | 3/2003 | Elze et al. |
| D499,637 S | 12/2004 | Elze et al. |
| 7,011,480 B2 | 3/2006 | Ahlert et al. |
| 7,128,510 B2 | 10/2006 | Ahlert et al. |
| 7,137,765 B1 | 11/2006 | Elze et al. |
| 7,909,554 B2 * | 3/2011 | Keenan .................. B60P 7/065 410/119 |
| 9,545,872 B1 | 1/2017 | Wilson et al. |
| 2002/0136614 A1 | 9/2002 | Elze et al. |
| 2004/0141824 A1 | 7/2004 | Ahlert et al. |
| 2004/0181156 A1 | 9/2004 | Kingsford et al. |
| 2006/0239791 A1 * | 10/2006 | Morris ..................... B60J 7/102 410/119 |
| 2009/0116927 A1 | 5/2009 | Keenan et al. |

FOREIGN PATENT DOCUMENTS

| | | |
|---|---|---|
| EP | 0 978 461 | 2/2000 |
| WO | WO 03/078251 | 9/2003 |

* cited by examiner

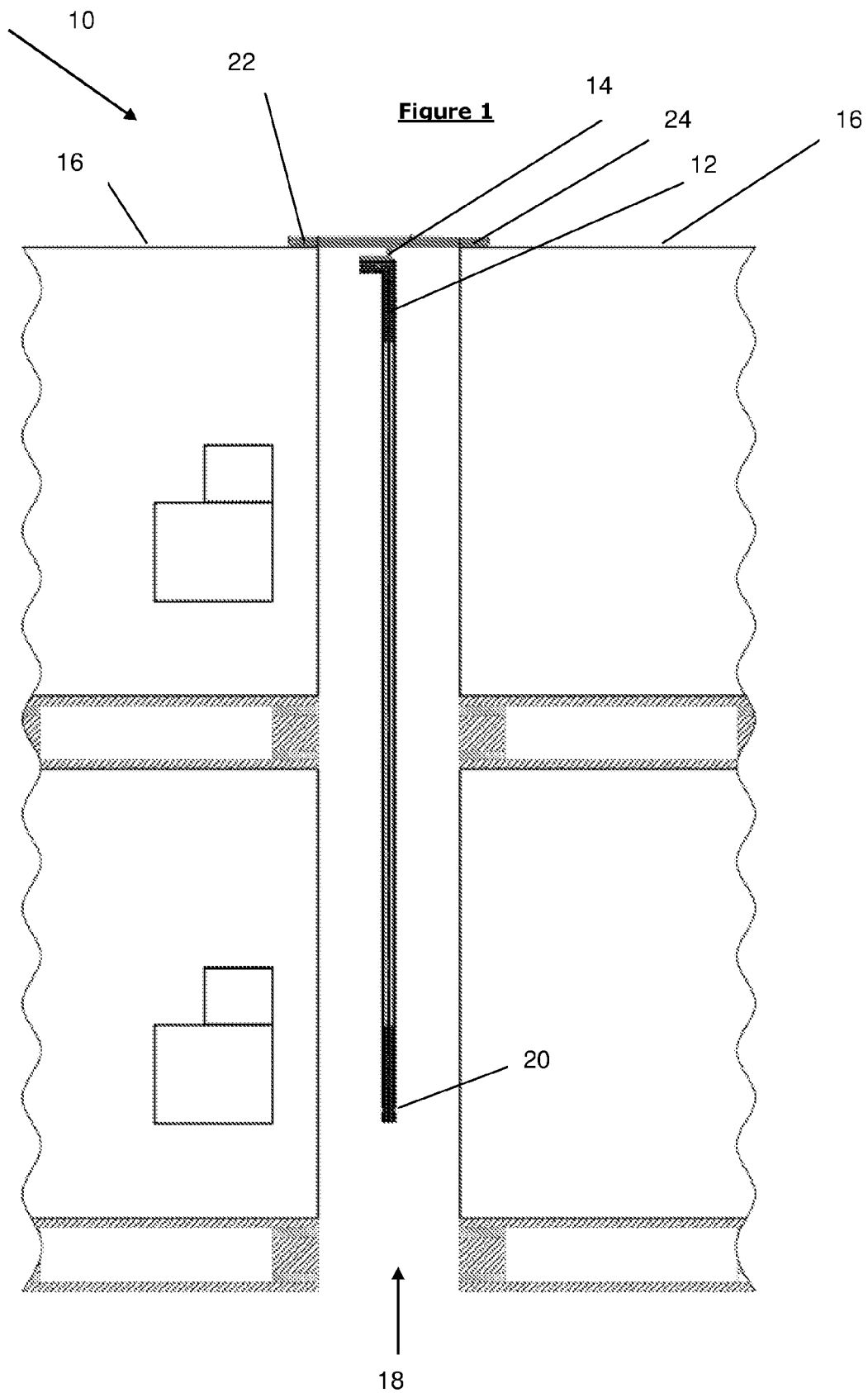

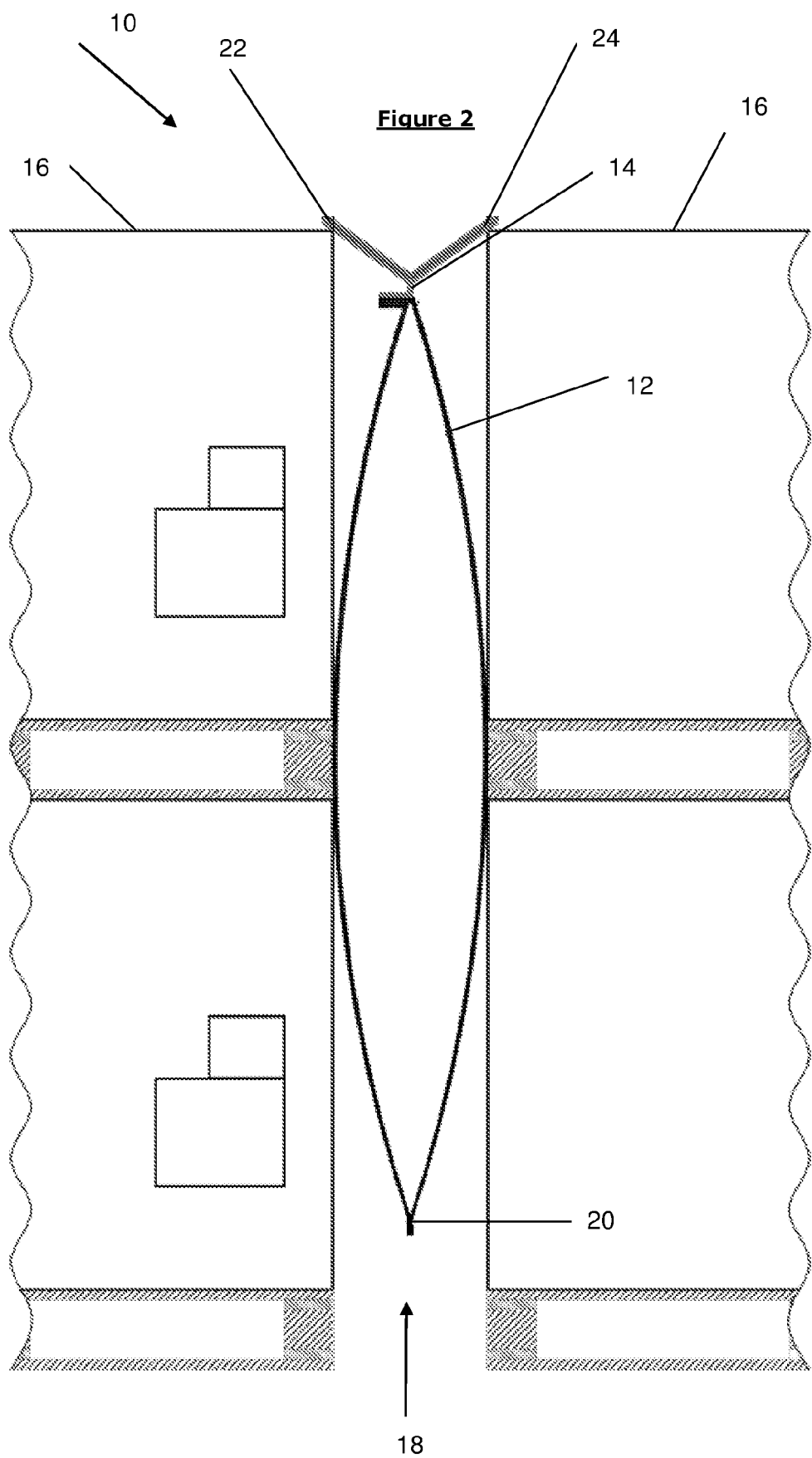

DUNNAGE BAG ARRANGEMENT

FIELD OF INVENTION

The present invention relates to a dunnage bag arrangement.

More particularly, the present invention relates to an inflatable dunnage bag arrangement.

BACKGROUND TO INVENTION

Conventional inflatable and disposable dunnage bags include a gastight bladder, usually constructed from polyethylene material, surrounded by an outer protective and supportive casing consisting of at least one ply of paper material. These dunnage bags are used to fill spaces between cargo or between the cargo and the walls of the freight carries in order to prevent the cargo from shifting and damaging either the cargo itself and/or the walls of the freight carrier. The dunnage bags are typically placed between the cargo in a deflated condition and are subsequently inflated with a gas. The pressure of the gas in the dunnage bags is determined by the application, the size and wall composition of the dunnage bags.

The problem with known dunnage bags is that when in the deflated position they slump together and are not correctly positioned or thrown in the void where they need to be inflated with the result that the inflated dunnage bag does not perform its function adequately. Hence currently when a dunnage bag is used, especially a long bag, it tends to flop around until it starts to be inflated. The disadvantages are that it is frustrating for the operator, is time consuming, sometimes the bag has to be deflated to reposition correct and sometimes it take two operators to position a bag It is an object of the invention to suggest a dunnage bag arrangement, which will assist in overcoming these problems.

SUMMARY OF INVENTION

According to the invention, a dunnage bag arrangement for securing loads, includes
 (a) an inflatable dunnage bag having a gastight inflatable bladder; and
 (b) a hanger member connected to the dunnage bag and adapted to being supported on top of loads and adapted to support the dunnage bag in a void between loads.

Also according to the invention, a method of securing load, includes the steps
 (a) of providing in a void between loads to be secured, an inflatable dunnage bag having a gastight inflatable bladder;
 (b) of supporting the inflatable dunnage bag in the void between the loads by means of a hanger member connected to the dunnage bag, the hanger member being adapted to being supported on top of the load; and
 (c) of inflating the inflatable dunnage bag to secure the loads.

The dunnage bag may include a reinforcing sleeve made of at least one material ply, the sleeve having a first opening and a second opening, and the sleeve being folded and sealed and/or stitched to close off at least one of the openings.

The size of the hanger member may be adjustable.

The size of the hanger member may depend on the size of the load application and/or the size of the void.

The hanger member may include at least two wing members.

The hanger member and/or the wing members may consist of a rigid material and/or may consist of a plastics material or metal.

The hanger member may be removably connected to the dunnage bag.

The hanger member may be re-usable.

The hanger member may be a hanger type extension to the dunnage bag so that it operates like wings and that these wings then rest on top of the load.

The sleeve may be made of at least one material ply selected from the material group consisting of paper, plastics material, woven PP (polypropylene), HDPE (high-density polyethylene) and PVC (polyvinylchloride).

The sleeve ends may consist of flaps formed by cutting the sleeve at the opening being closed.

The flaps at one end may be folded towards each other to close off the respective opening and/or at one end may be glued to each other to permanently close off the respective opening.

The dunnage bag may be provided with one to six plies of paper sleeves.

The inflatable bladder may be made of polyethylene.

The inflatable bladder may be provided with an inflation valve.

The inflation valve may protrude to the exterior at one of the openings.

The dunnage bag may be adapted to be used in voids larger than 12 inches and/or the void may be smaller than 40 inches.

The dunnage bag may be substantially rectangular in shape.

The dunnage bag may be disposable.

The dunnage bag may be applicable in conjunction with void fillers and/or be applicable in conjunction with friction panels.

At least 50% of the exterior surface area of the dunnage bag may be adapted to be in contact with a load to be secured.

The contact may be direct and/or indirect.

BRIEF DESCRIPTION OF DRAWINGS

The invention will now be described by way of example with reference to the accompanying schematic drawings.

In the drawings there is shown in:

FIG. 1: a sectional side view of the dunnage bag arrangement according to the invention in position hanging between four pallets before being inflated; and FIG. 2: a sectional side of the dunnage bag arrangement shown in FIG. 1 after being inflated.

DETAILED DESCRIPTION OF DRAWINGS

Referring to the drawings, there is shown a dunnage bag arrangement in accordance with the invention. The dunnage bag arrangement 10 for securing loads, includes an inflatable dunnage bag 12 having a gastight inflatable bladder; and a hanger member 14 connected to the dunnage bag 12 and adapted to being supported on top of loads 16 and adapted to support the dunnage bag 12 in a void 18 between loads 16. The dunnage bag 12 includes a reinforcing sleeve made of at least one material ply, the sleeve having a first opening and a second opening, and the sleeve being folded and sealed and/or stitched to close off at least one of the openings 20. The size of the hanger member 14 can be adjustable. The size of the hanger member 14 depends on the size of the load application and the size of the void 18.

The hanger member 14 includes two wing members 22 and 24. The hanger member 14 and the wing members 22 and 24 consist of a rigid material. The hanger member 14 and the wing members 22 and 24 consist of a plastics material or metal. The hanger member 14 is removably connected to the dunnage bag 12 and is thus re-usable. The hanger member 14 is a hanger type extension to the dunnage bag 12 so that it operates like wings and that these wings then rest on top of the load 16. The sleeve is made of at least one material ply selected from the material group consisting of paper, plastics material, woven PP (polypropylene), HDPE (high-density polyethylene) and PVC (polyvinylchloride). The sleeve ends consist of flaps formed by cutting the sleeve at the opening being closed. The flaps at one end are folded towards each other to close off the respective opening. The flaps at one end are glued to each other to permanently close off the respective opening.

The dunnage bag arrangement 10 can be provided with one to six plies of paper sleeves. The inflatable bladder is made of polyethylene. The inflatable bladder is provided with an inflation valve. The inflation valve protrudes to the exterior at one of the openings. The dunnage bag arrangement 10 can be used in voids larger than 12 inches. The void can also be smaller than 40 inches. The dunnage bag arrangement 10 can be substantially rectangular in shape. The dunnage bag arrangement 10 can be disposable. The dunnage bag arrangement 10 is applicable in conjunction with void fillers. The dunnage bag arrangement 10 is applicable in conjunction with friction panels. At least 50% of the exterior surface area of the dunnage bag 12 can be adapted to be in contact with a load to be secured. The contact can be direct or indirect.

Hence the dunnage bag arrangement 10 according to the invention, provides a method of securing load, which includes the steps of providing in a void 18 between loads 16 to be secured, an inflatable dunnage bag 12 having a gastight inflatable bladder; of supporting the inflatable dunnage bag 12 in the void 18 between the loads 16 by means of a hanger member 14 connected to the dunnage bag 12, the hanger member 14 being adapted to being supported on top of the load 16; and of inflating the inflatable dunnage bag 12 to secure the loads 16. This ensures the following correct positioning of the bag 12 therefore less chances of damage; is less time consuming; and requires only one operator.

The invention claimed is:

1. A dunnage bag arrangement for securing multiple loads, the dunnage bag arrangement comprising:
   (a) an inflatable dunnage bag including a gastight inflatable bladder;
   (b) first and second wing members connected to one another; and
   (c) a hanger member connectable to the dunnage bag, the hanger member connected to the first and second wing members,
   wherein the first and second wing members rest atop the loads and are sized to collectively extend across a void between the loads to support the dunnage bag when the dunnage bag is positioned in the void between the loads, and
   wherein the first wing member pivots relative to the second wing member when the dunnage bag is positioned in the void between the loads and the dunnage bag is inflated to form a non-parallel configuration in which the first and second wing members are not parallel to one another.

2. The dunnage bag arrangement of claim 1, wherein the dunnage bag includes a reinforcing sleeve made of at least one material ply, the sleeve having a first opening and a second opening, and the sleeve being folded and at least one of (1) sealed and (2) stitched to close off at least one of the openings.

3. The dunnage bag arrangement of claim 1, wherein a size of the hanger member is adjustable.

4. The dunnage bag arrangement of claim 1, wherein at least one of (1) the hanger member and (2) the wing members are made of a rigid material, the rigid material including plastic or metal.

5. The dunnage bag arrangement of claim 1, wherein the hanger member is removably connectable to the dunnage bag.

6. The dunnage bag arrangement of claim 2, wherein the sleeve is made of at least one material ply selected from a material group consisting of paper, plastics material, woven polypropylene, high-density polyethylene, and polyvinylchloride.

7. The dunnage bag arrangement of claim 1, wherein the dunnage bag includes one to six plies of paper sleeves.

8. The dunnage bag arrangement of claim 1, wherein the inflatable bladder is made of polyethylene.

9. The dunnage bag arrangement of claim 2, wherein the inflatable bladder includes an inflation valve.

10. The dunnage bag arrangement of claim 9, wherein the inflation valve protrudes outside the inflatable bladder at one of the openings.

11. The dunnage bag arrangement of claim 1, wherein the dunnage bag is sized for use in voids larger than 12 inches and smaller than 40 inches.

12. The dunnage bag arrangement of claim 1, wherein the dunnage bag is substantially rectangular in shape.

13. The dunnage bag arrangement of claim 1, wherein the dunnage bag is applicable in conjunction with at least one friction panel.

14. The dunnage bag arrangement of claim 1, wherein at least 50% of an exterior surface area of the dunnage bag is in contact with the loads to be secured when the dunnage bag is positioned in the void between the loads.

15. The dunnage bag arrangement of claim 14, wherein the contact is direct or indirect.

16. A method of securing multiple loads, the method comprising:
   (a) positioning an inflatable dunnage bag that includes a gastight inflatable bladder in a void between the loads;
   (b) positioning first and second wing members atop the loads such that the first and second wing members collectively extend across the void and such that a hanger member connected to the first and second wing members supports the inflatable dunnage bag in the void; and
   (c) inflating the inflatable dunnage bag to secure the loads, wherein the first and second wing members are connected to each other such that when the dunnage bag positioned in the void between the loads is inflated, the first wing member pivots relative to the second wing member to form a non-parallel configuration in which the first and second wing members are not parallel to one another.

17. The dunnage bag arrangement of claim 1, wherein the first and second wing members are movable relative to one another between: (1) a first configuration in which a first angle separates the first and second wing members; and (2) the non-parallel configuration in which a second angle separates the first and second wing members, the second angle different than the first angle.

18. The dunnage bag arrangement of claim 17, wherein the first angle is greater than the second angle.

19. The dunnage bag arrangement of claim 18, wherein the first angle is 180 degrees such that the first and second wing members are parallel to one another when in the first configuration.

20. A dunnage bag hanger comprising: first and second wing members connected to one another; and
- a hanger member connectable to a dunnage bag and to the first and second wing members connected to each other;
- wherein the first and second wing members are configured to rest atop loads and are sized to collectively extend across a void between the loads to support the dunnage bag when the dunnage bag is positioned in the void, and
- wherein the first and second wing members are pivotally connected to one another to form a non-parallel configuration, in which the first and second wing members are not parallel to one another, when the dunnage bag is inflated.

21. The dunnage bag hanger of claim 20, wherein the first and second wing members are movable relative to one another between: (1) a first configuration in which a first angle separates the first and second wing members; and (2) the non-parallel configuration in which a second angle separates the first and second wing members, the second angle different than the first angle.

22. The dunnage bag hanger of claim 21, wherein the first angle is greater than the second angle.

23. The dunnage bag hanger of claim 22, wherein the first angle is 180 degrees such that the first and second wing members are parallel to one another when in the first configuration.

* * * * *